US009028902B2

(12) United States Patent
Evseev

(10) Patent No.: US 9,028,902 B2
(45) Date of Patent: May 12, 2015

(54) METHOD FOR PRODUCING BREAD FROM AERATED DOUGH

(76) Inventor: Nikolay Vladimirovich Evseev, Voronezh (RU)

( * ) Notice: Subject to any disclaimer, the term of this patent is extended or adjusted under 35 U.S.C. 154(b) by 0 days.

(21) Appl. No.: 14/122,778

(22) PCT Filed: Jul. 24, 2012

(86) PCT No.: PCT/RU2012/000603
§ 371 (c)(1),
(2), (4) Date: Feb. 10, 2014

(87) PCT Pub. No.: WO2013/019148
PCT Pub. Date: Feb. 7, 2013

(65) Prior Publication Data
US 2014/0161951 A1 Jun. 12, 2014

(30) Foreign Application Priority Data
Aug. 2, 2011 (RU) .................. 2011132372

(51) Int. Cl.
*A21D 8/02* (2006.01)
*A21C 1/02* (2006.01)
(Continued)

(52) U.S. Cl.
CPC . *A21D 8/025* (2013.01); *A21C 1/02* (2013.01); *A21C 1/10* (2013.01); *B01F 7/00583* (2013.01);
(Continued)

(58) Field of Classification Search
CPC ........... A21D 8/00; A21D 8/02; A21D 8/025; A21D 2/02; A21D 2/04; A21D 6/00; A21C 1/10; A21C 1/02; A21C 1/1445; A23L 1/0082; A23L 1/0085; A23L 1/0091; A23L 1/0097; B01F 7/1605; B01F 7/161; B01F 13/1022
USPC ......... 426/234, 496, 498, 561, 312, 504, 446, 426/447, 503, 518, 519, 559, 564, 568; 99/323.4, 467, 485
See application file for complete search history.

(56) References Cited

U.S. PATENT DOCUMENTS 3,332,371 A * 7/1967 Brastad .......................... 426/498
3,424,590 A * 1/1969 Booras .......................... 426/243
(Continued)

FOREIGN PATENT DOCUMENTS

EP 629115 B1 * 10/1996 ............... A21D 2/22
JP H01206944 A 8/1989
(Continued)

*Primary Examiner* — Drew Becker
*Assistant Examiner* — Bryan Kim
(74) *Attorney, Agent, or Firm* — Nadya Reingend

(57) ABSTRACT

The components of the dough recipe are mixed in a dough mixing apparatus (2). The resulting dough is divided into portions, each of which is aerated to produce aerated dough. Mixing and aerating are performed by separate devices. Aeration is performed at a pressure no less than 0.3 MPa, and the pressure is then reduced to atmospheric at a controlled rate of 0.02-0.2 MPa/s. The lowering of pressure to atmospheric occurs either before or after the removal of the aeration device (6) from the dough. The aeration process is performed in baking molds (1), or in intermediate vessels (16), and the dough is subsequently transferred to the molds (1). The transfer occurs either into the molds (1) under atmospheric pressure, after lowering the pressure in the intermediate vessels (16) to atmospheric, or into the molds (1) under increased pressure, where the pressure is decreased to atmospheric after the transfer is completed. The claimed invention simplifies and increases the accuracy of dividing the dough into portions of a specified weight, enhances the quality of the aerated dough, reduces energy consumption and increases production efficiency.

10 Claims, 6 Drawing Sheets

(51) Int. Cl.
 *A21C 1/10* (2006.01)
 *A21D 6/00* (2006.01)
 *A21C 1/14* (2006.01)
 *B01F 7/16* (2006.01)
 *B01F 13/10* (2006.01)
 *B01F 7/00* (2006.01)

(52) U.S. Cl.
 CPC .. *A21D 6/00* (2013.01); *A21D 8/02* (2013.01); *A21C 1/1445* (2013.01); *B01F 7/1605* (2013.01); *B01F 7/161* (2013.01); *B01F 13/1022* (2013.01)

(56) References Cited

U.S. PATENT DOCUMENTS

| | | | | |
|---|---|---|---|---|
| 5,549,922 | A | * | 8/1996 | Juchem .................. 426/618 |
| 5,593,712 | A | * | 1/1997 | Poilane .................. 426/19 |
| 2003/0035857 | A1 | | 2/2003 | Sroka |
| 2008/0226785 | A1 | * | 9/2008 | Drocco et al. ............. 426/504 |

FOREIGN PATENT DOCUMENTS

RU 2371921 S1 11/2009
RU 2380907 S1 2/2010

* cited by examiner

METHOD FOR PRODUCING BREAD FROM AERATED DOUGH

CROSS-REFERENCE TO RELATED APPLICATIONS

The present patent application claims priority to PCT application PCT/RU2012/000603 filed on Jul. 24, 2012, which claims priority to Russian patent application RU2011132372 filed Aug. 2, 2011.

FIELD OF INVENTION

The invention relates to bakery production, and may be used for bread production using aerated, including unleavened, dough.

BACKGROUND

A known method of producing aerated baked goods exists (MPK A21D 13/00, RU J 2320174 P 1, 17.06.2006, BuI No 9, 27.03.2008, authors: Magomedov G. O., Ponomareva E. I., Shelest T. N., Krutsky S. N., Peshekhonovo A. B., (analog), where the mixing of the starting dough ingredients occurs within 1 minute and the rotation of the mixing device is 5 c-1, followed by the dough aeration process which occurs at a pressure of 0.35 MPa using the same device, for 3-5 minutes at a rotation speed of 13.3 c-1, then the dough is divided into portions of 150-170 g and baked.

Disadvantages of this method are decreased precision and more complicated technical implementation when dividing the aerated dough into portions of a specified weight, since the baking industry divides dough into portions of a specified weight on a volume basis, dividing portions from the dough mass of equal volumes, whereas after completion of the aeration process the aerated dough is an aerated foam-like mass, whose characteristics, including density, are as dependent on the parameters of the aeration process as they are on the ratio of ingredients in the dough and their properties, meaning that using a volume-based division process for aerated dough after completion of the aeration process does not provide an acceptable level of accuracy. In the proposed method, the process of dough division is performed after completion of the mixing process, so that the dough is a homogenous mass, before it is aerated and forms an aerated foam-like structure, which provides increased accuracy when dividing the dough into specified weights and simplifies technical implementation of the division process, for example using a high-performance industrial dough divider.

Another drawback of the existing method above is a decreased quality of finished aerated dough, consisting of an aerated foam-like mass, due to partial destruction of the foam occurring during the aerated dough division process. Foam destruction is caused initially by sharp unregulated drops of pressure in the zone where the dough exits from the dough mixing apparatus—being under increased pressure equal to 0.35 Mpa—into the atmosphere, which ruptures the shell of air bubbles during the drop in foam pressure. In the present method, the pressure is dropped around each portion of the aerated dough with a controlled speed between 0.005-0.015 mPa/s, providing minimum foam destruction and maximum dough rise.

Another drawback of the existing method above is the use of the same devices for the mixing and aeration processes. Specifically, the aeration process is conducted within and by the same mixing device used for conducting the mixing process. However the processes of mixing and aeration have different objectives—the mixing process combines dry and liquid ingredients, resulting in a homogenous dough mass, whereas the aeration process saturates that homogenous dough mass with air. Therefore, in order to mix the basic ingredients, one should use a dough mixer apparatus with strong rigid mixing elements designed for heavy loads, having minimal surface contact with the dough, and for the aeration process, one should use aeration devices similar to the "beater," having a large amount of relatively thin, elastic wire-knives, which are designed to create in the homogenous dough mass upon rotation as many cuts as possible, so air can pass into them and be evenly distributed inside the dough. The aeration device requires less power. The use of mixing devices in analogs for performing the aeration process decreases the quality of the aerated dough, increases energy requirements, and lowers production efficiency.

A known invention even closer to the technical nature is a method for producing aerated unleavened bread from whole grain wheat (MPK A21D 13/02, RU J 2364087 P 1, 26.02.2008, BuI No 23, 20.08.2000, authors: Magomedov G. O., Ponomareva E. I., Aleynik I. A.) (prototype), where within the first 5-15 minutes, the process of mixing the starting ingredients for dough at a mixing device rotation speed of 15 c-1 occurs, and is followed by the dough aeration process at a pressure of 0.4 MPa using the same mixing device, for a period of 6-12 minutes at a rotation speed of 20c-1, after which the dough dividing process makes 0.25 kg portions and is consequently baked.

Disadvantages of this method are decreased precision and more complicated technical implementation when dividing the aerated dough into portions of a specified weight, since the baking industry divides dough into portions of a specified weight on a volume basis, dividing the dough into portions of equal volumes, whereas after completion of the aeration process the aerated dough is an aerated foam-like mass, whose characteristics, including density, are as dependent on the parameters of the aeration process as they are on the ratio of ingredients in the dough and their properties, meaning that using a volume-based division process for aerated dough after completion of the aeration process does not provide an acceptable level of accuracy. In the proposed method, the process of dough division is performed after completion of the mixing process, so that the dough is a homogenous mass, before it is aerated and forms an aerated foam-like structure, which provides increased accuracy when dividing the dough into specified weights and simplifies technical implementation of the division process, for example using a high-performance industrial dough divider.

Another drawback of this existing method is a decreased quality of finished aerated dough, consisting of an aerated foam-like mass, due to partial destruction of the foam occurring during the aerated dough division process. Foam destruction is caused initially by sharp unregulated drops of pressure in the zone where the dough exits from the dough mixing apparatus—being under increased pressure equal to 0.4 MPa—into the atmosphere, which ruptures the shell of air bubbles during the drop in foam pressure. In the present method, the pressure is dropped around each portion of the aerated dough at a controlled rate between 0.005-0.015 mPa/s, providing minimum foam destruction and maximum dough rise.

Another drawback of this existing method is the use of the same devices for the mixing and aeration processes. Specifically, the aeration process is conducted within and by the same mixing device used for conducting the mixing process. However, the processes of mixing and aeration have different objectives—the mixing process combines dry and liquid ingredients, resulting in a homogenous dough mass, whereas the aeration process saturates that homogenous dough mass with air. Therefore, in order to mix the basic ingredients, one should use a dough mixer apparatus with strong rigid mixing elements designed for heavy loads, having minimal surface contact with the dough, and for the aeration process, one should use aeration devices similar to the "beater", having a large amount of relatively thin, elastic wire-knives, which are designed to create in the homogenous dough mass upon rotation as many cuts as possible, so air can pass into them and be evenly distributed inside the dough. The aeration device requires less power. The use of mixing devices in analogs for performing the aeration process decreases the quality of the aerated dough, increases energy requirements, and lowers production efficiency.

The technical results of the claimed invention are simplification and improved precision of the process of dividing the dough into portions of specified weight, improved quality of the aeration dough, improved energy efficiency, and increased production efficiency.

Technical results are achieved by the bread production method using aerated, including unleavened, dough, comprised of processes of mixing dough, aeration of the dough, division of dough into portions of a predetermined weight and bread baking, where the process of division is performed after conclusion of the mixing process, before the aeration process, then the aeration process is performed by the aeration device separately for each portion of dough, after which the bread baking with the aerated dough is conducted under the corresponding baking conditions. The processes of mixing and aerating the dough are performed with separate devices, preferably suited to performing mixing and aeration processes, respectively. The aeration process is performed under a pressure of no less than 0.3 MPa followed by decreasing pressure to atmospheric, and the pressure decreasing to atmospheric is performed at a controlled rate, between 0.02-0.2 MPa/s, which is optimal for minimal foam destruction and maximal dough rise. The decrease rate depends on the dough type, the gluten content, the dough humidity, the rate and properties of other ingredients, etc. The pressure decreasing is performed either before or after removal of the aeration devices from the dough. The process of aeration a portion of dough is performed in baking molds, or in intermediate vessels, followed by transfer of the dough into the baking mold. Transfer of the aerated dough from the intermediate vessels is performed either in baking molds under atmospheric pressure after lowering the pressure in the intermediate vessels to atmospheric, or in baking molds under the same increased pressure as the intermediate vessels, where the pressure is decreased to atmospheric after the transfer is completed.

SUMMARY

These results are achieved by the bread production method using aerated, including unleavened, dough, comprised of the processes of mixing dough, performed at atmospheric pressure, aeration of the dough, performed at increased pressure (typically no less than 0.3 Mpa), division of the dough into portions of a predetermined weight, and bread baking. The process of division is performed after conclusion of the mixing process and before the aeration process. The aeration process is then performed by the aeration device separately for each portion of dough. Then, the aeration device is extracted from the dough and the pressure is decreased to atmospheric pressure. It should be noted that the decrease of pressure can occur either before or after the extraction of the aeration device from the dough, and the pressure is decreased at a steady rate around 0.005-0.015 MPa/s, resulting in minimal foam destruction and maximum dough rise, after which the bread baking with the aerated dough is conducted under the corresponding baking conditions. The pressure reduction rate depends on the type of dough, gluten content, the dough's moisture levels, the ratios and properties of other ingredients, etc. The process of aerating a portion of dough is performed in baking molds, or in intermediate containers, followed by transfer of the dough into the baking mold, where the transfer of the aerated dough from the intermediate containers produces either (1) baking molds under atmospheric pressure after their pressure was lowered to atmospheric pressure in the intermediate containers, or (2) baking molds under the same increased pressure as the intermediate containers, where the pressure is decreased to atmospheric pressure after the transfer is completed. The processes of mixing and aerating the dough are performed by using different devices preferably suited for performing the mixing and aeration.

Simplification and improved accuracy of the process of dividing dough into portions of a specific weight is achieved by carrying out the process of dividing the dough after completing the mixing process, when the dough is a homogenous mass, before it is aerated and forms the dough's aerated foam-like structure. This removes the need to divide the foam-like mass, whose characteristics, including density, are dependent on the parameters of the aeration process as well as the ratio of ingredients in the dough and their properties. Division of thoroughly mixed dough with a homogenous structure ensures increased precision when dividing the dough into specified weights and simplifies the technical implementation of the division process, for example using a high-performance industrial dough divider.

Improved aerated dough quality is achieved first and foremost by eliminating sharp pressure drops in the expansion zone of the aerated dough. After the dough is aerated, the pressure is decreased at a controlled rate between 0.005-0.015 MPa/s, producing minimal destruction of the resulting foam-like structure and maximum rise in the dough before baking. Improved quality is also achieved because the dough mixing and aeration processes are performed using different devices, preferably suited to performing mixing and aeration processes, respectively, since the mixing and aeration processes have different objectives—the mixing process combines dry ingredients with liquid ones, resulting in a homogenous mass of dough, and the aeration process saturates the homogenous mass with air. Therefore, in order to mix the basic ingredients, the present invention suggests the use of a dough mixer apparatus with strong rigid mixing elements designed for heavy loads, having minimal surface contact with the dough, and for the aeration process, the present invention suggests use of aeration devices similar to the "beater", having a large amount of relatively thin, elastic wire-knives, which are designed to create in the homogenous dough mass upon rotation as many cuts as possible, so air can pass into them and be evenly distributed inside the dough. The resulting dough, prepared in accordance with the present method, is lighter, with a more stable foam, and the bread made from this aerated dough bakes more thoroughly and has more porous crumbs.

Reducing energy consumption is also due to the use of separate devices for mixing and aeration the dough, preferably suited to performing mixing and aeration processes. Thus, the use of aeration devices in the aeration process instead of mixing devices allows a power reduction of the actuator by a factor of two per each individual mass of processed dough.

Increased production is achieved firstly due to the division of the dough into portions of a specific weight, conducted after completing the process of mixing the dough ingredients into a homogenous mass, i.e. until the foam-like structure is formed, which allows it to be used in the dough division process of high-performance industrial dough dividers. Increases in productivity are also achieved as a result of using equipment designed specifically for mixing and aeration in the mixing and aeration processes, which reduced aeration time by a factor of three.

BRIEF DESCRIPTION OF THE DRAWINGS

FIG. 4 shows a stage where the dough that has been mixed in the mixer is divided into portions of a specified weight and moved to intermediate vessels, placed on the carriage, which has baking molds attached under the intermediate vessels. Shown here is the process of introducing the carriages with intermediate vessels and baking molds into a hermetically sealed aeration chamber.

FIG. 5 shows a stage where the specified increased pressure is created in the aeration chamber, the aeration devices are introduced to the intermediate vessels with portions of dough, and the dough is aerated simultaneously in all the intermediate vessels by the aeration devices.

FIG. 6 shows a stage of the aeration devices being removed from the intermediate vessels.

FIG. 7 shows a stage of transferring the aerated dough from the intermediate vessels into the baking molds.

FIG. 8 shows a stage of controlled decrease of pressure in the aeration chamber, accompanied by the rising of dough in the baking molds and forming of the foam-like structures.

FIG. 9 shows a stage of carriage introduction with intermediate vessels and baking molds with aerated dough from the aeration chamber.

DETAILED DESCRIPTION OF THE PREFERRED EMBODIMENT

A method for production of bread using aerated dough is implemented by the following devices.

Figure 1:
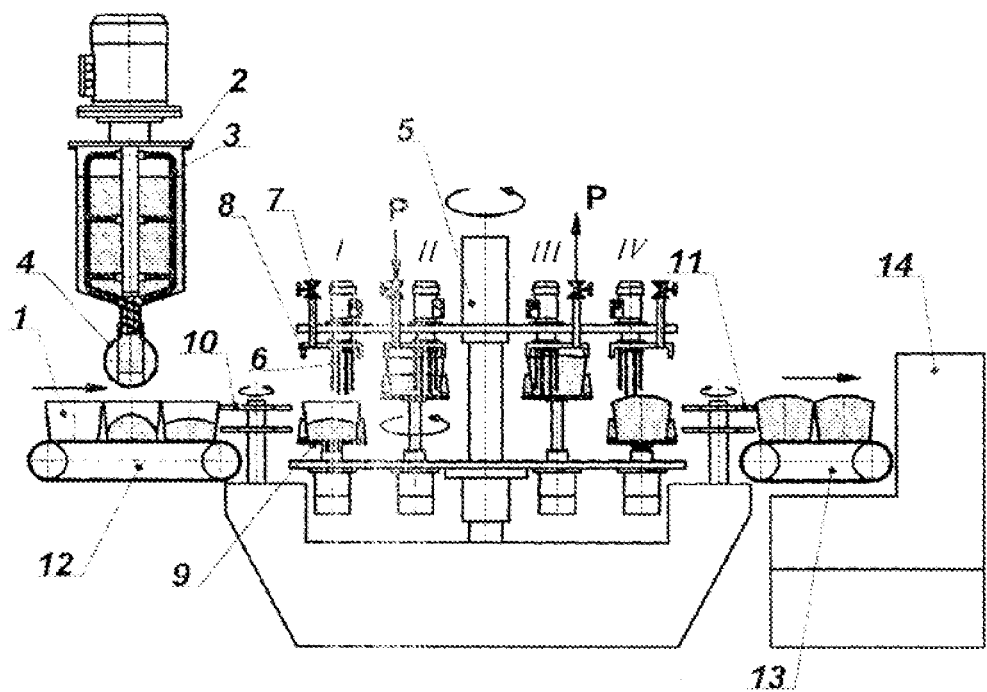
In FIG. 1, a line for production of aerated, unleavened dough is displayed.

FIG. 1 shows a line for the production of aerated unleavened bread, with dough aeration occurring directly in the baking molds 1, comprised of a dough mixing apparatus 2 with a mixing device 3, fitted with a dough divider 4, aeration carousel 5, having several positions for aerating dough, each of which is supplied with an aeration device 6, a device 7 for supplying and regulating pressure, a sealing cover 8, and a lift table 9. The line contains the input and output star wheels 10, 11, supply and output transporters 12, 13, and a baking oven 14. The rotation speed of the aeration carousel and the amount of aeration positions are determined by the capacity of the production line and dough aeration time. Roman numerals I-IV indicate the stages of the process.

Figure 2:
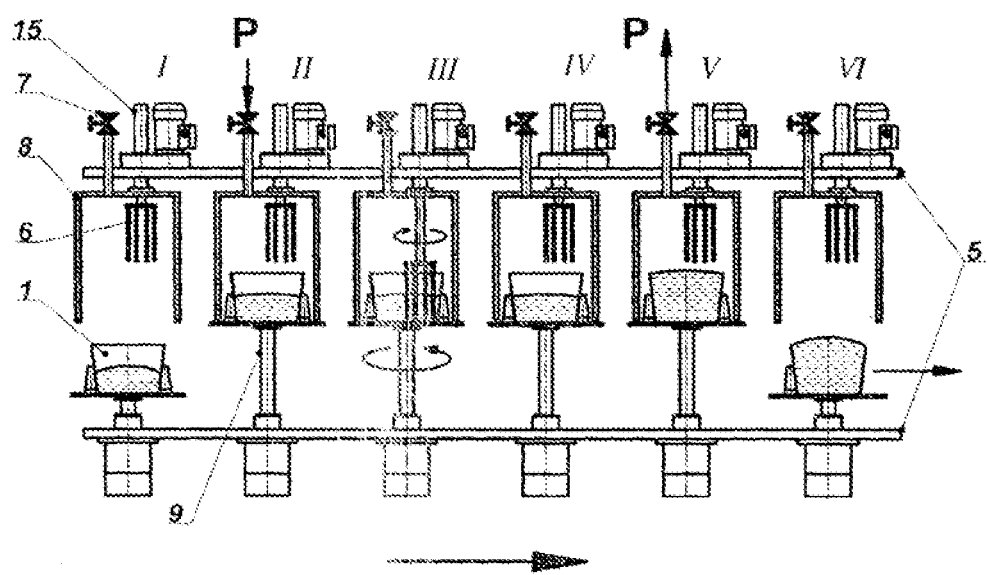
FIG. 2 shows six stages of the process of aeration dough on a dough carousel. In contrast to FIG. 1, the aeration device is removed from the dough before starting to decrease pressure.

FIG. 2 shows the six stages of the aeration process on the aeration carousel 5, equipped with additional mechanisms 15 for lifting and lowering the aeration device 6. Roman numerals I-IV indicate the stage of the process.

Figure 3:
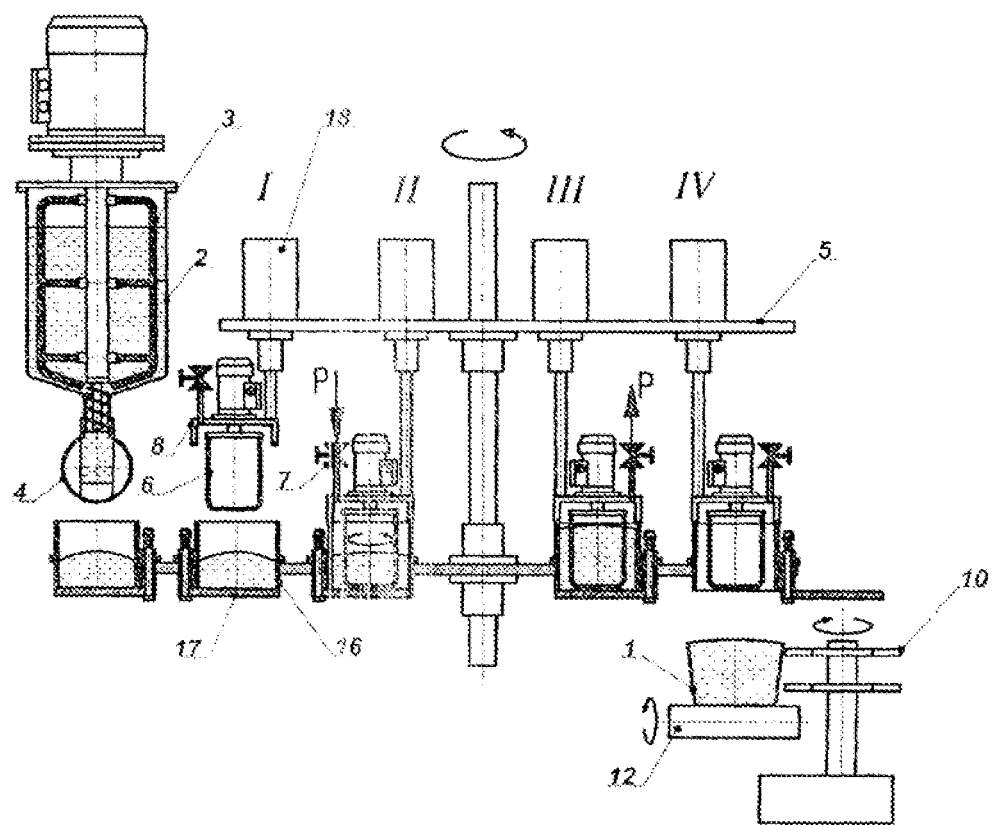
FIG. 3 shows an installation for production of aerated, unleavened bread, on which the aeration process is performed in intermediate vessels and followed by transfer of the aerated dough into the baking mold. The transfer of dough occurs after the pressure is decreased in the intermediate vessels.

FIG. 3 shows the aerated unleavened dough production line, where the dough is aerated in intermediate vessels 16, consisting of the dough mixing apparatus 2 with a mixing device 3, equipped with a dough divider 4, aeration carousel 5, having several positions for aeration of dough, each of which includes the intermediate glass 16, with a hermetically sealed bottom 17 and sealing cover 8, lifting and lowering mechanism 18 for sealing cover, with aeration device 6 and device 7 for supplying and regulating pressure drop installed on it. The line also contains the supply transporter 12, feeding empty baking molds 1 to the position where aerated dough from the intermediate vessels 16 is transferred onto them, and the supply star wheel 10, which synchronizes the baking mold 1 and intermediate glass positions in the aerated dough transfer zone. Roman numerals I-IV indicate the stage in the process.

FIGS. 4-9 show the installation for aerated unleavened bread production, comprising a dough mixing apparatus 2 with mixing device 3, equipped with a dough divider 4, aeration chamber 19 with periodic operation, equipped with a device 7 for supply and adjustable decrease of pressure, having several positions for aeration of dough, each of which is fitted with additional mechanisms 15 for lifting and lowering the aeration device 6. The installation also includes a carriage 20 fitted with intermediate vessels 16, and nests 21 for placing and affixing baking molds 1 under the intermediate vessels 16. The quantity and position of the intermediate vessels on the carriage 20 correspond to the quantity and position of the aeration devices 6 and aeration chamber 19.

The present method can be illustrated by the following examples:

Example 1

FIG. 1

The previously prepared components of the dough recipe are mixed for 5-15 minutes in the dough mixing apparatus 2 under atmospheric pressure by the mixing device 3 are a rotation of 5 $c^{-1}$, The mixed dough is divided by the dough divider 4 into portions of specified weight, which are placed in the baking molds 1, that are constantly supplied to the dough divider zone by the transporter 12. The dough division process can be performed either by using the dough divider 4, mounted directly on the dough mixing apparatus 2, or using a commercial dough divider, which transfer the mixed dough from the dough mixing apparatus 2 after completion of the mixing process. Baking molds 1 are loaded with dough portions of specified weight and supplied by the same transporter 12 to the constantly rotating (at a set speed) aeration carousel 5, and using the input star wheel 10 are placed in aeration position, where the baking molds 1 are fixed to a lift table 9 (stage I). Each aeration position is equipped with a aeration device 6, device 7 to supply and regulate decreases in pressure, and a seal cover 8. The quantity of aeration positions and rotation speed of the aeration carousel 5 are determined by the production line and dough aeration time. In the process of aeration carousel 5 rotation, each baking mold 1 loaded with a portion of dough is lifted by the lifting table 9 and sealed to the seal cover 8. Inside the baking mold, device 7 creates the specified pressure, for example 0.4 MPa and the portion of dough is aerated by the aeration device 6 (stage II) at a rotation speed of 16 $c^{-1}$ for a duration of 40-60 seconds, resulting in dough saturated with air via mechanical distribution throughout the dough mass, also due to the additional dissolved air in the soluble components of the dough, a result of aeration under increased pressure. The dough mixing and aeration processes are performed using different devices, preferably suited to performing mixing and aeration processes, respectively, since the mixing and aeration processes have different objectives—the mixing process combines dry ingredients with liquid ones, resulting in a homogenous mass of dough, and the aeration process saturates the homogenous mass with air. Therefore, in order to mix the basic ingredients use a dough mixer apparatus 2 with strong rigid mixing elements 3 designed for heavy loads, having minimal surface contact with the dough, and for the aeration process use aeration devices 6 similar to the "beater", having a large amount of relatively thin, elastic wire-knives, which are designed to create in the homogenous dough mass upon rotation as many cuts as possible, so air can pass into them and be evenly distributed inside the dough. This increases the effectiveness of performing each of the aforementioned processes, lowers their power consumption and increases productivity of the processes, as well as increases the quality of the aerated dough produced. After completing the dough aeration process, a device 7 reduces the pressure inside the mold to atmospheric, with the pressure decrease performed at a controlled rate, between 0.02-0.2 MPa/s, ensuring minimal foam destruction and maximum dough rise. Then the lift table 9 is lowered, the aeration device 6 is removed from the dough and molds 1 with aerated dough portions are constantly moved away by the outgoing star wheel 11 from the aeration carousel to the outgoing transporter 13 and directed to the bread-baking oven 14, where the aerated dough is baked under the corresponding baking settings. In experiments conducted at those same dough aeration parameters as the prototype, the total operating power of the aeration devices at that same production level decreased more than 2 times for each individual mass of processed dough.

The accuracy of volume-based division of mixed dough into portions of a specified weight, at a portion weight of 0.25-0.5 kg, is within 2-3%, while the prior art's used volume-based foam division and weight of a portion of specified volume ultimately depends on the content of the ingredient, aeration modes, dough moisture, amount of aerated dough left in the dough mixing apparatus, etc. Aeration time in the present method is 2-3 minutes, while the prior art is between 6-12 minutes, thus decreasing aeration time by 3-4 times. The dough, prepared in accordance with the present method is lighter, with more stable foam, and the bread made from this aerated dough bakes more thoroughly and has more porous crumbs.

Example 2

FIG. 2

After mixing and dividing the dough, the baking molds 1, loaded with dough portions of specified weight, are installed in the aeration position, where they are fixed to lift tables 9 (stage I). During the process of rotating the aeration carousel 5, every baking mold 1 loaded with dough portions is lifted by the lift table 9 and sealed with the seal cover 8, forming a hermetically sealed chamber, within which a device 7 creates the specified pressure increase, for example 0.3 MPa (stage II). The aeration device 6 is inserted and performs the dough aeration at a specified rotation speed (stage III). After completing the aeration process, the aeration device 6 is removed from the dough (stage IV), then inside the sealed chamber the device 7 lowers pressure to atmospheric pressure (stage V), with the pressure decrease performed at a controlled rate between 0.005-0.015 MPa/s. Next, the lift tables 9 are lowered (stage VI), and the baking molds 1 with aerated dough are constantly removed from the aeration carousel 5 and directed to the baking oven, where bread is baked from aerated dough at the corresponding baking settings. In this given example, in contrast to example No. 1, the aeration device is removed from the dough (stage IV) before starting to decrease the pressure in the aeration zone (stage V), i.e. before the start of the expansion process of the aerated dough mass and formation of a foam-like structure in the baking mold. The resulting aerated dough is of a higher quality due to eliminating foam destruction caused by the aeration device, but construction of the installation for aeration of dough in this example's embodiment of the present method is more complicated.

Example 3

FIG. 3

The previously prepared components of the dough recipe are mixed thoroughly in the dough mixing apparatus 2 at atmospheric pressure by the mixing device 3. The mixed dough is divided by the dough divider 4 into portions of a specified weight, which are moved to the intermediate vessels 16 with a hermetically sealed bottom 17 installed on the aeration carousel 5. During rotation of the aeration carousel 5, each intermediate glass 16 is placed under a sealing cover 8, equipped with an aeration device 6 and a device 7 for supplying and adjusting the pressure drop (stage I). Then, the intermediate glass 16 is hermetically sealed by the seal cover 8 using the mechanism 18 for raising and lowering the cover 8, the interior of the intermediate glass 16 reaches the specified increased pressure, for example 0.5 MPa and performs the process of aeration of the dough portions using an aeration device 6 at a given rotation speed (stage II). After completing the aeration process, the pressure inside the intermediate glass 16 is dropped to atmospheric by the device 7 (stage III). At the point of transfer, the bottoms 17 are shifted and the aerated dough from the intermediate vessels 16 is loaded in the baking mold 1 (stage IV), being constantly fed to the loading zone by the supply transporter 12. The positions of baking molds 1 and intermediate vessels 16 in the aerated dough loading zone are synchronized using a star sprocket 10. Further, baking molds 1 with aerated dough are directed by the same transporter 12 to the baking oven, where aerated dough baking is performed under the corresponding baking settings. In this example, in contrast with examples 1 and 2, the dough aeration process is performed not in the baking molds 1 but rather in the intermediate vessels 16. Aeration of dough in the baking molds imposes some limitations on implementing the baking mold. Firstly, all baking molds must have a non-stick coating prior to aeration, since coating a mold before performing the aeration process leads to mixing of the lubricant with dough during its aeration process in the baking mold, which is unacceptable. Secondly, aeration in molds always necessitates using molds of a certain configuration, with which all the aeration devices must be compatible, limiting the range of producible baked goods. It is simpler and cheaper to produce a small amount of intermediate vessels with a frictionless coating rather than hundreds of baking molds with non-stick coatings, which lowers the cost of bread production on the installation, implemented in example 3, compared to examples 1 and 2. The given embodiment of the proposed method is more technically difficult, but is also more universal and can be implemented with any bread factory.

Example 4

FIGS. 4-9

Figure 4:
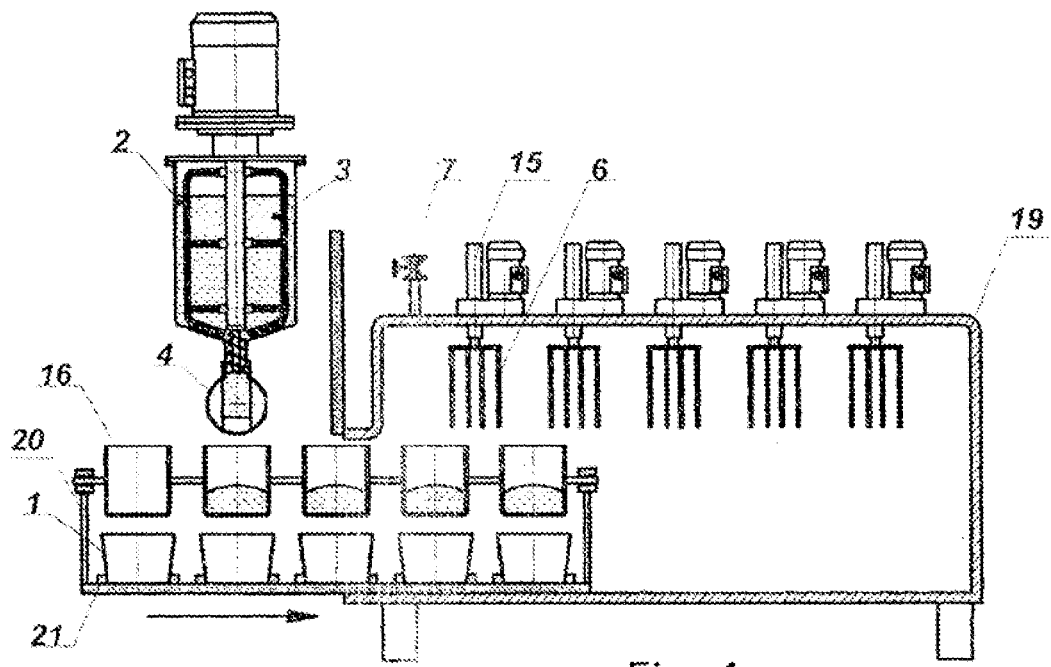
FIGS. 4-9 show six stages of the dough aeration process in the aeration chamber in periodic operation, where the dough aeration process is conducted in intermediate vessels with subsequent transfer of the aerated dough into baking molds attached to the carriages under the intermediate vessels. Unlike FIG. 3, the transfer of the dough occurs from intermediate vessels into baking molds having the same increased pressure as the intermediate vessels in the process of aeration dough, and the process of decreasing pressure in the aeration chamber only begins after the transfer.
Figure 5:
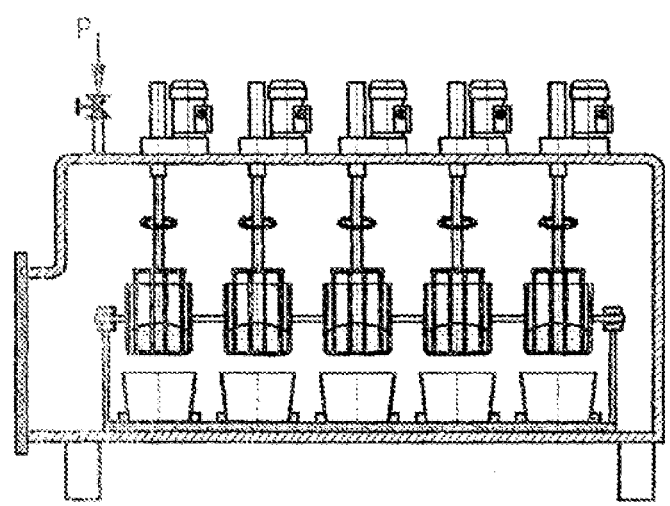
Figure 6:
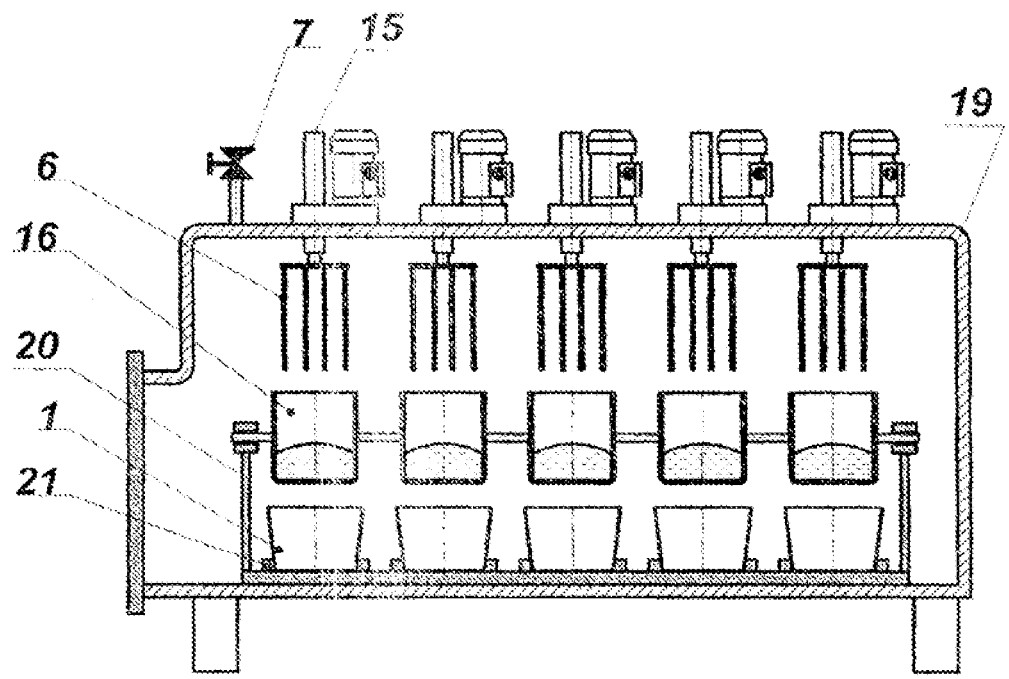
Figure 7:
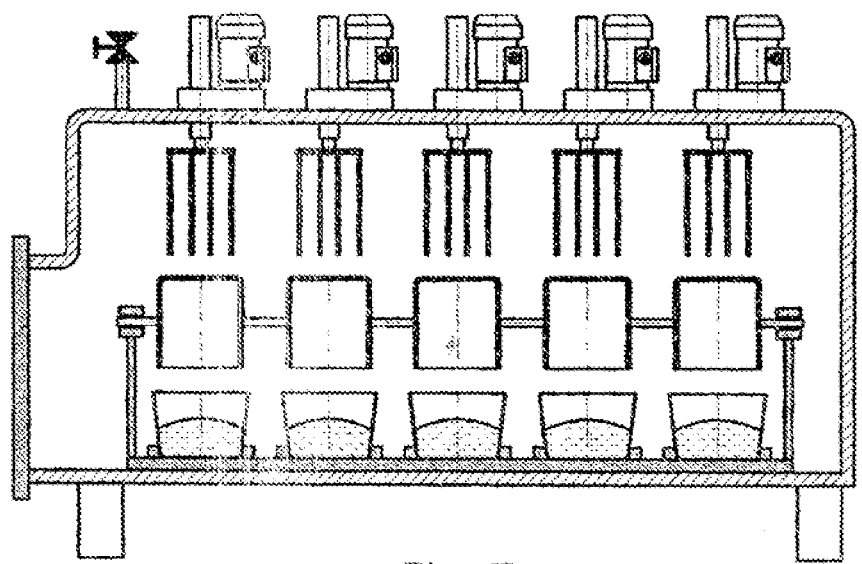
Figure 8:
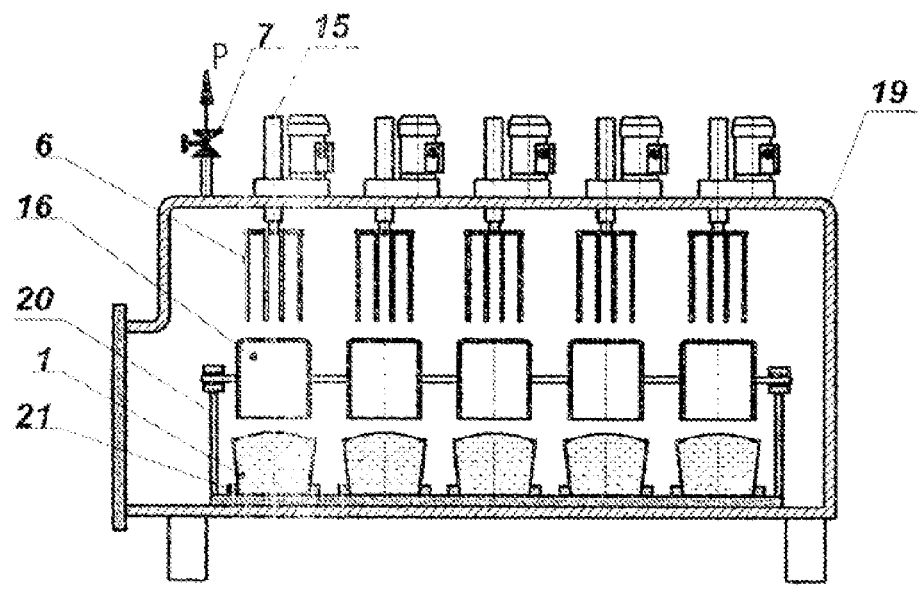
Figure 9:
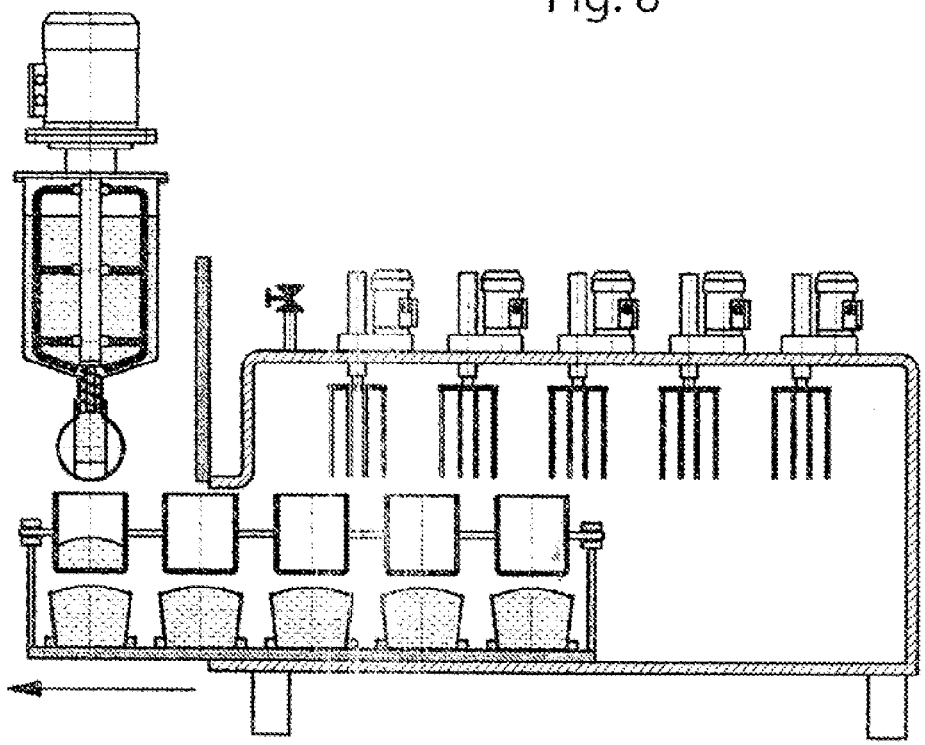

The previously prepared components of the dough recipe are thoroughly mixed in the dough mixing apparatus 2 under atmospheric pressure by the mixing device 3 (FIG. 4). The mixed dough is divided by the dough divider 4 into portions of a specified weight, which are placed in intermediate vessels 16, mounted on a carriage 20, under which intermediate glass 16 and empty baking mold 1 is attached via nests 21 for fixation. After filling all of the intermediate vessels with dough portions of a specified weight, the carriage 20 is placed in a hermetically sealed aeration chamber 19 with periodic operation. The aeration chamber 19 is equipped with a device 7 to supply and regulate pressure decreases, and has several dough aeration positions, each of which is fitted with aeration devices 6. The quantity of aeration devices 6 and their placement in the aeration chamber 19 correspond to the amount of intermediate vessels 16 and their placement on the carriage 20. Inside the aeration chamber 19, a device 7 creates the specified increase in pressure, for example 0.6 MPa, after which the dough aeration process is performed by the aeration device 6 simultaneously in all of the intermediate vessels 16 (FIG. 5). After completing the aeration process, the aeration device is removed from the dough (FIG. 6), and the aerated dough is loaded into intermediate vessels 16 and baking molds 1, positioned under the vessels on the carriage 20 (FIG. 7). After this, the pressure in the aeration chamber 19 is decreased to atmospheric by the device 7, while the dough rises in the baking molds 1 and forms the foam-like structures of the aerated dough (FIG. 8). The time it takes to lower pressure from 0.6 MPa to atmospheric, depending on the type of dough and the size of the dough pieces, takes 20-60 seconds. After lowering the pressure in the aeration chamber 19 to atmospheric, the carriage 20 is withdrawn from the aeration chamber 19 (FIG. 9). Intermediate vessels 16 are once again filled with lines of dough portion, and the baking molds 1 with aerated dough are removed from the carriage 20 and directed to the bread baking oven, where the bread baking is performed using aerated dough at the corresponding baking settings. In this example, in contrast to example 3, the loading of the dough from the intermediate vessels happens in the baking molds under the same increased pressure as the intermediate vessels during the aeration process, with the pressure decreased back to atmospheric after completing loading of the aerated dough. This is why expansion of the aerated mass of aerated dough and formation of the foam-like structure happens directly in the baking mold, increasing the quality of the aerated dough. This embodiment of the present method is productive but technically more complex than the variant in example 3. It does, however, allow production of a higher quality bread.

Technical and Economic Indicators

Simplification and increased precision of the process of dividing dough into portions of a specific weight are due to performing the dough division process prior to the aeration, i.e. before formation of the aerated foam-like dough structure. Accuracy of volume-based division of mixed dough into portions of a specified weight, and at a portion weight of 0.25-0.5 kg, is within 2-3%, while the prior art's used volume-based foam division and the weight of a portion of specified volume depends on the content of the ingredient, aeration modes, dough moisture, amount of aerated dough left in the dough mixing apparatus, and so forth. Dividing the mixed dough with a homogenous structure permits using the process on a high-performance commercial dough divider, having increased precision when dividing dough into specified weights.

Increasing the quality of aerated dough is due to eliminating sharp pressure drops in the expansion zone of the aerated dough. After the dough is aerated, the pressure is decreased at a controlled rate between 0.005-0.015 MPa/s, producing minimal destruction of the resulting foam-like structure and maximum rise in the dough before baking. Improved quality is also achieved because the dough mixing and aeration processes are performed using different devices preferably suited to performing mixing and aeration processes, respectively. The resulting dough, prepared in accordance with the proposed method, is lighter, with more stable foam, and the bread made from this aerated dough bakes more thoroughly and has more porous crumbs.

Increases in energy efficiency are achieved as a result of using equipment designed specifically for mixing and aeration in the mixing and aeration processes. Therefore, when using aeration devices similar to a "beater" during the aeration process the total operating power of the aeration devices at the same production level decreases more than 2 times for each individual mass of processed dough.

An increase in productivity of production of more than 3 times is due to performing the dough division process on a high-performance commercial dough divider and performing the mixing and aeration processes with devices that are designed especially for performing mixing and aeration processes, respectively.

The invention claimed is:

1. A method for producing a bread using a foamed dough, comprising: processes of mixing a dough, dividing the dough into portions of specified weight, foaming each portion of the dough separately and baking of the bread, wherein the division process is performed after completion of the mixing process, before the foaming process, after which the foamed dough is baked into the bread;
    wherein the foaming is performed by a plurality of mechanical devices;
    wherein each of the portions of the dough is foamed by one of the plurality of mechanical devices;
    wherein each mechanical device comprises a plurality of elastic wire-knives,
    wherein the foaming process is carried out under a pressure greater than atmospheric pressure;
    wherein the pressure is decreased to atmospheric either before or after removal of said elastic wire knives;
    wherein decreasing the pressure to atmospheric is performed at a controlled rate.

2. The method according to claim 1, wherein conducting the mixing and foaming of the dough is performed by the plurality of mechanical devices each of which is designed specifically for mixing and foaming processes, respectively.

3. The method according to claim 1, wherein performing said foaming process is carried out under a pressure of no less than 0.3 MPa followed by decreasing pressure to atmospheric.

4. The method according to claim 3, wherein decreasing pressure to atmospheric is performed at a controlled rate, between 0.02-0.2 MPa/s.

5. The method according to claim 3, wherein decreasing pressure to atmospheric is performed prior to the removal of the foaming device from the dough.

6. The method according to claim 3, wherein decreasing pressure to atmospheric is performed after the removal of the foaming device from the dough.

7. The method according to claim 1, wherein the foaming process is performed in intermediate vessels inside of which the dough is temporarily transferred for foaming with a subsequent loading of the dough in baking molds.

8. The method according to claim 7, wherein the loading of said foamed dough from the intermediate vessels into the baking molds is performed under atmospheric pressure and the loading is performed after decreasing the pressure in the intermediate vessels to atmospheric.

9. The method according to claim 7, wherein the loading of the foamed dough from the intermediate vessels into the baking molds is performed at the same increased pressure that the intermediate vessels are under during the foaming process, and decreasing of the pressure to atmospheric occurs after loading the dough into the baking molds.

10. The method according to claim 1, wherein the foaming process as well as plurality of the processes comprising claim 1 are performed in the same baking molds;
   wherein the baking molds are capable of withstanding the foaming pressure and shaped to fit the elastic wire knives.

* * * * *